Patented July 17, 1951

2,561,044

UNITED STATES PATENT OFFICE 2,561,044

STABILIZED HALOGEN-CONTAINING RESINS

Massimo Baer, Indian Orchard, Mass., assignor to Monsanto Chemical Company, St. Louis, Mo., a corporation of Delaware No Drawing. Application January 5, 1946,
Serial No. 639,421

13 Claims. (Cl. 260—45.75)

This invention relates to the art of stabilizing vinyl resins. More particularly, this invention relates to preventing the deterioration of halogen-containing vinyl resins.

The stabilization of halogen-containing vinyl resins has presented a serious problem, particularly when it is desired to manufacture light colored articles that do not discolor on heating. Many types of stabilizing materials has been suggested for preventing deterioration of such polymeric products but while some have effected substantial improvement, there has still been much to be desired in the results obtained.

It is an object of this invention to provide halogen-containing vinyl resin compositions having improved resistance to deterioration.

A particular object of this invention is to provide halogen-containing vinyl resin compositions having increased resistance to deterioration at elevated temperatures.

These and other objects are accomplished according to this invention by intimately mixing an organometallic lead salt of an alpha, beta-olefinic carboxylic acid in a halogen-containing vinyl resin. According to a preferred embodiment of our invention an organometallic lead salt of an alpha, beta-olefinic carboxylic acid, is incorporated in a halogen-containing polymerizable compound having a $CH_2=C<$ group and then the mixture is subjected to polymerizing conditions.

The following examples are illustrative of the invention but are not to be construed as limitative thereof. Where parts are mentioned they are parts by weight.

Table

| Examples | Polymerizable Materials | Lauroyl Peroxide | Stabilizer |
|---|---|---|---|
| | | Parts | Parts |
| I | Vinyl chloride 8.8 parts<br>Diethyl maleate 1.2 parts | 0.05 | |
| II | Vinyl chloride 8.8 parts<br>Diethyl maleate 1.2 parts | 0.05 | 0.1 |
| III | Vinyl chloride 8.8 parts<br>Diethyl maleate 1.2 parts | 0.05 | 0.25 |
| IV | Vinyl chloride 10 parts | 0.05 | |
| V | ....do.... | 0.05 | 0.25 |
| VI | Vinyl chloride 8.8 parts<br>Vinyl acetate 1.2 parts | 0.05 | |
| VII | Vinyl chloride 8.8 parts<br>Vinyl acetate 1.2 parts | 0.05 | 0.25 |

The stabilizer used in the examples is triethyl lead monohexyl maleate (which may be obtained by reacting hexyl hydrogen maleate with tetraethyl lead). The several ingredients set forth in each of the above examples are placed in a suitable vessel and after sealing the vessel, it is placed in a water bath at 60° C. for about 17 hours. The product obtained in Example I is a transparent resinous material but is found to be colored dark yellow whereas the products obtained in Examples II and III are transparent, colorless resins. Furthermore the products obtained in Examples II and III are resistant to discloration on heating. For example, the product in Example III may be molded into discs 0.075 inch in thickness by pressing for about 1½ minutes at a temperature corresponding to that of steam under a pressure of 100 pounds per square inch (gauge). The discs are transparent and substantially colorless.

Similarly, discs molded from the products described in Examples V and VII under the same conditions are transparent and substantially colorless whereas discs molded under the same conditions from the products described in Examples IV and VI are badly discolored.

The stabilizers of the invention may also be incorporated into preformed halogen-containing resins and the mixtures are found to be resistant to deterioration on heating. However, surprisingly, when such mixtures are heated for substantial lengths of time, the products become hazy in contrast to the perfectly clear products obtained in Examples II, III, V and VII. For example, if about 2.5 parts of the stabilizer used in Examples II, III, V and VII are intimately mixed with 100 parts of a heteropolymer of vinyl chloride and diethyl maleate (made from the same proportions of vinyl chloride and diethyl maleate as in Examples II and III), by milling or rolling at a temperature of 250° F. for about two minutes, the mixture obtained is colorless but has a definite haze. This haze becomes clearly evident on pressing the milled sheet obtained from the rolls, between polished metal plates to form discs about 0.075 inch in thickness. Despite the haze in the products prepared in this manner, the stabilizing action of the lead salt is still obtained since similar treatment of unstabilized copolymers result in a transparent but badly discolored material.

It is apparent from the foregoing results that surprising and advantageous effects are obtained by intimately mixing and heating an organolead salt of an alpha, beta-olefinic unsaturated acid in a halogen-containing vinyl resin. Among other advantages, the use of the stabilizer of the invention permits halogen-containing vinyl resins to be processed into sheets or other articles without discoloration.

In place of the resins used in the examples, similar improvements may be effected by incorporating the stabilizer of the invention in other halogen-containing vinyl resins, numerous examples of which are well-known to those skilled in the art. Examples of vinyl or substituted vinyl compounds from which such resins may be made include vinyl chloride, vinylidene chloride, vinyl chloracetate, chlorostyrenes, chlorobutadiene, etc.

Such vinyl or substituted vinyl compounds may be polymerized singly or in admixture with these or other halogen-containing vinyl or substituted vinyl compounds or with vinyl or substituted vinyl compounds free from halogen, such as vinyl acetate, methyl acrylate, methyl methacrylate, styrene, etc. The stabilizer of the invention is particularly effective with heteropolymers of vinyl chloride and diethyl maleate having varying vinyl chloride contents or other esters of maleic or other alpha, beta-unsaturated polycarboxylic acids such as fumaric acid, citraconic acid, aconitic acid, etc.

The stabilizer of the invention is also effective when intimately mixed with halogen-containing resins in which part or all of the halogen is introduced into preformed resin, e. g., chlorinated polyvinyl acetate, chlorinated polystyrene, chlorinated polyvinyl chloride and the like. Usually chlorine is introduced into the preformed resin by treatment in the presence of a softening agent for the resin.

While the stabilizers of the invention may be used in combination with halogen-containing vinyl resins by incorporating the stabilizer either before or after polymerization of the monomeric materials, when transparent products are desired it is necessary to incorporate the stabilizer prior to polymerization.

In place of maleic acid, the stabilizers of the invention may be made from other alpha, beta-olefinic carboxylic acids such as, itaconic, citraconic, aconitic, fumaric, crotonic, methyl crotonic, beta-vinyl acrylic, beta-isopropyl acrylic, sorbic, mesaconic methyl ethyl maleic, diethyl maleic, diphenyl maleic, chloro-maleic, cinnamic, dibenzyl maleic, glutaconic, muconic, monophenyl maleic, ethylidine succinic and alpha, alpha-dimethyl itaconic acids.

The organo-metallic lead salts may be made by reacting an organo-metallic lead halide, oxide or hydroxide with the desired carboxylic acid or its salts. The organic radicals attached to the lead atom of the lead salt (there may be one, two or three of such organic groups) may be alkyl, aryl or mixed alkylaryl groups or even other organic groups such as hydrocarbon radicals substituted by ester, halogeno, (e. g., chloro), keto, carboxyl groups and the like. As examples of alkyl groups may be mentioned straight or branched chain propyl, butyl, amyl, hexyl, heptyl, octyl groups and the like. Examples of aryl group-containing radicals which may be used are phenyl, tolyl, xylyl, benzyl, naphthyl, phenyl ethyl and the like. Examples of specific compounds within the above classifications are triethyl lead mono hexyl maleate, triethyl lead mono-2-ethyl hexyl maleate, di(tributyl lead) fumarate, triphenyl lead mono-hexyl maleate, dibenzyl lead maleate, monohexyl lead tricrotonate, dihexyl lead di-(mono ethyl maleate), dibutyl lead di(mono octyl itaconate).

The proportion of the stabilizer of the invention incorporated in a halogen-containing vinyl resin may be varied depending on the nature of the resin and of the stabilizer used as well as the conditions under which the product is to be used. Usually, at least 0.1% of stabilizer based on the amount of vinyl resin is necessary to prevent discoloration under even moderate conditions of heating and, preferably, 0.5–4% are used though larger amounts, e. g., 5–6% may be desirable under some conditions.

When desired, stabilizers of other types may be used along with the stabilizers of the invention, e. g., the various types of basic compounds previously suggested for this purpose.

It is to be understood that the above description is given by way of illustration only, and not of limitation, and that deviations are possible within the spirit of the invention.

What is claimed:

1. A composition comprising a vinyl resin having combined chlorine and, as the sole heat stabilizer therefore, an organometallic lead salt of an alpha,beta-olefinic carboxylic acid intimately mixed therewith in a stabilizing amount.

2. A composition comprising a vinyl resin containing vinyl chloride polymerized therein and, as the sole heat stabilizer therefor, an organometallic lead salt of an alpha,beta-olefinic carboxylic acid intimately mixed therewith in a stabilizing amount.

3. A composition as defined in claim 2 in which the vinyl resin is polyvinyl chloride.

4. A composition as defined in claim 2 in which the vinyl resin is a heteropolymer of vinyl chloride and diethyl maleate.

5. A composition as defined in claim 2 in which the vinyl resin is a copolymer of vinyl chloride and vinyl acetate.

6. A composition as defined in claim 2 in which the lead salt is a hydrocarbon lead salt of an alpha, beta olefinic carboxylic acid.

7. A composition as defined in claim 2 in which the lead salt is an alkyl lead salt of an alpha, beta olefinic carboxylic acid.

8. A composition as defined in claim 2 in which the lead salt is an aryl lead salt of an alpha,beta-olefinic carboxylic acid.

9. A composition as defined in claim 2 in which the lead salt is incorporated prior to polymerization of the vinyl compound.

10. A composition comprising a hetero-polymer of vinyl chloride and diethyl maleate and, as the sole heat stabilizer therefor, a hydrocarbon lead salt of an alpha, beta-olefinic carboxylic acid incorporated therein prior to polymerization in a stabilizing amount.

11. A composition as defined in claim 10 in which the lead salt is an alkyl lead salt.

12. A composition as defined in claim 10 in which the lead salt is an aryl lead salt.

13. A composition as defined in claim 10 in which the lead salt is triethyl lead monohexyl maleate.

MASSIMO BAER.

REFERENCES CITED

The following references are of record in the file of this patent:

UNITED STATES PATENTS

| Number | Name | Date |
|---|---|---|
| 2,174,545 | Alexander | Oct. 3, 1939 |
| 2,219,463 | Yngve | Oct. 29, 1940 |
| 2,267,777 | Yngve | Dec. 30, 1941 |
| 2,307,157 | Quattlebaum, Jr., et al. | Jan. 5, 1943 |
| 2,477,549 | Richard | July 26, 1949 |